(12) United States Patent
Lam

(10) Patent No.: US 7,852,041 B2
(45) Date of Patent: Dec. 14, 2010

(54) CONSERVATION OF ELECTRICAL ENERGY AND ELECTRO-MAGNETIC POWER IN BATTERY CHARGER

(76) Inventor: Dat D. Lam, E. 7011 10th St., Spokane Valley, WA (US) 99212

( * ) Notice: Subject to any disclaimer, the term of this patent is extended or adjusted under 35 U.S.C. 154(b) by 0 days.

(21) Appl. No.: 12/168,865

(22) Filed: Jul. 7, 2008

(65) Prior Publication Data

US 2008/0265843 A1 Oct. 30, 2008

Related U.S. Application Data

(63) Continuation of application No. 11/426,571, filed on Jun. 26, 2006, now Pat. No. 7,411,363.

(51) Int. Cl.
*H01M 10/44* (2006.01)
*H01M 10/46* (2006.01)
(52) U.S. Cl. .................. 320/101; 320/108
(58) Field of Classification Search ............. 320/101, 320/108; 323/238, 247, 251, 262, 328, 332, 323/344, 346, 901, 908; 363/21.04; 388/907, 388/922
See application file for complete search history.

(56) References Cited

U.S. PATENT DOCUMENTS

| | | | |
|---|---|---|---|
| 4,021,717 A | 5/1977 | Furuishi et al. | |
| 4,031,449 A | 6/1977 | Trombly | |
| 4,273,989 A | 6/1981 | Hinton et al. | |
| 5,625,543 A | 4/1997 | Barrett | |
| 5,929,598 A * | 7/1999 | Nakama et al. | 320/108 |
| 6,104,169 A * | 8/2000 | Radys et al. | 320/138 |
| 6,239,585 B1 | 5/2001 | Buono | |
| 6,346,797 B1 | 2/2002 | Perreault et al. | |
| 6,449,175 B1 * | 9/2002 | Cuadra et al. | 363/89 |
| 6,479,970 B2 | 11/2002 | Reddy | |
| 6,538,909 B2 | 3/2003 | Goodarzi et al. | |
| 6,664,762 B2 | 12/2003 | Kutkut | |
| 6,909,617 B1 | 6/2005 | Mirskiy | |
| 2004/0189251 A1 | 9/2004 | Kutkut et al. | |
| 2006/0018134 A1* | 1/2006 | Tsuruya | 363/21.04 |
| 2007/0029965 A1* | 2/2007 | Hui | 320/112 |

* cited by examiner

*Primary Examiner*—Edward Tso
*Assistant Examiner*—Arun Williams
(74) *Attorney, Agent, or Firm*—Yen Lam

(57) ABSTRACT

The present disclosure is an energy-efficient rapid battery charger, using inductive windings rather than transformer to charge a battery. The apparatus operates with an AC power source rectifying a high voltage DC output or AC source transformed to a low DC voltage output. The control driver frequencies vary from several hundred Hz to thousand of Hz. A capacitor, inductor, and power line are arranged in a series parallel combination tank circuit that operates over the on and off time of a complete cycle. During on-time, the inductor is charged with electromagnetic power. During off-time, the electromagnetic power in the inductor discharges into the battery.

2 Claims, 12 Drawing Sheets

DC Drive with Double-Wire Winding and One Transistor

Single Wire Winding
(Prior Art)

Double-Wire Winding

Four-Wire Winding

I Core

E Core

DC Drive with Single-Wire Windings
and Two Transistors

DC Drive with Single-Wire Winding
and One Transistor

DC Drive with Double-Wire Winding
and Two Transistors

DC Drive with Double-Wire Winding
and One Transistor

DC Drive with Four-Wire Winding
and Two Transistors

DC Drive with Four-Wire Winding
and One Transistor

AC Drive with Single-Wire Windings
and H-Bridge Drive

AC Drive with Single-Wire Windings
and H-Bridge Drive

CONSERVATION OF ELECTRICAL ENERGY AND ELECTRO-MAGNETIC POWER IN BATTERY CHARGER

CROSS REFERENCE TO RELATED APPLICATIONS

This application claims priority to and is a continuation in part of U.S. patent application Ser. No. 11/426,571, filed Jun. 26, 2006, the entire contents of which are herein incorporated by reference.

BACKGROUND a) Field

The present disclosure relates generally to an apparatus, system and method for conserving energy in rapid battery charging systems.

b) Background Art

Charging batteries is a complex electrochemical process. A battery charger is a device used to put energy into a cell or rechargeable battery by forcing an electric current through it. The present disclosure generates electromagnetic power to recharge a battery in less time than the conventional art.

DETAILED DESCRIPTION OF THE PREFERRED EMBODIMENTS

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal, electromagnetic wave signal, or data signal. The meaning of "a", "an", and "the" include both singular and plural references. The meaning of "in" includes "in" and "on".

Additionally, the symbols + and − in the figures indicate the direction of current flow in the windings.

Overview

Figure 1A:
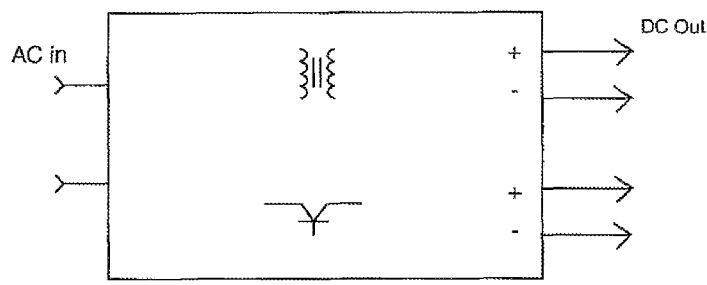
FIG. 1A a block diagram of a transformer, rectifier, or transistor used to generate the DC output for the AC or DC Drive.
Figure 1B:
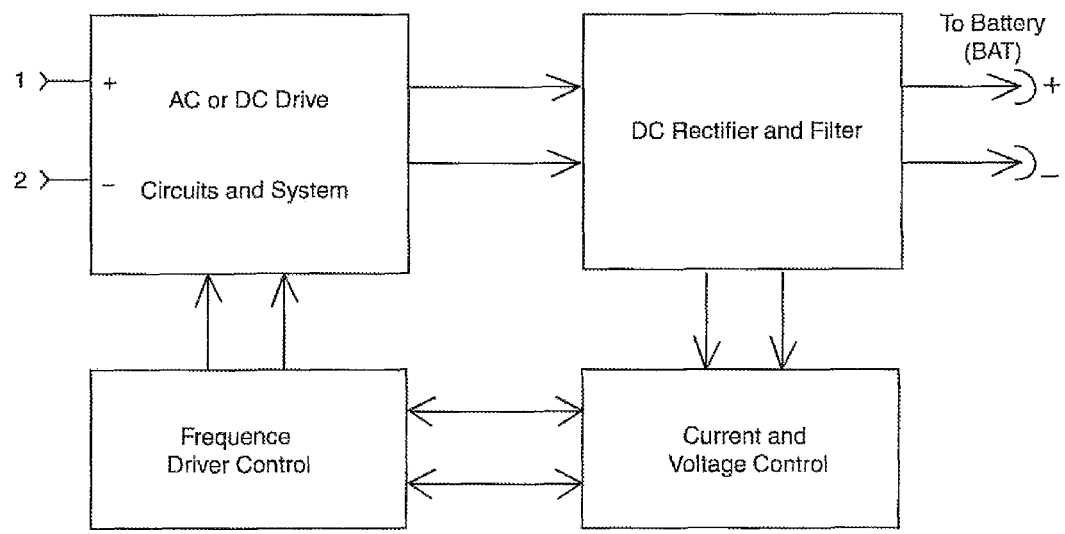
FIG. 1B is a block diagram of the system of the battery charger according to the present disclosure.

The disclosure is configured to receive an alternating current (AC) input and provide a direct current (DC) drive or AC drive for charging a battery. As shown in FIG. 1A, a transformer, rectifier, or transistor is used to generate the DC output for the AC or DC Drive. FIG. 1B is a block diagram that provides an overview of the present disclosure.

Figure 2:
FIG. 2 is a representation of a single wire winding.
Figure 3:
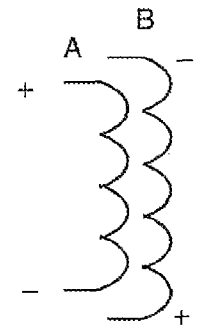
FIG. 3 is a representation of a double wire winding.
Figure 5:
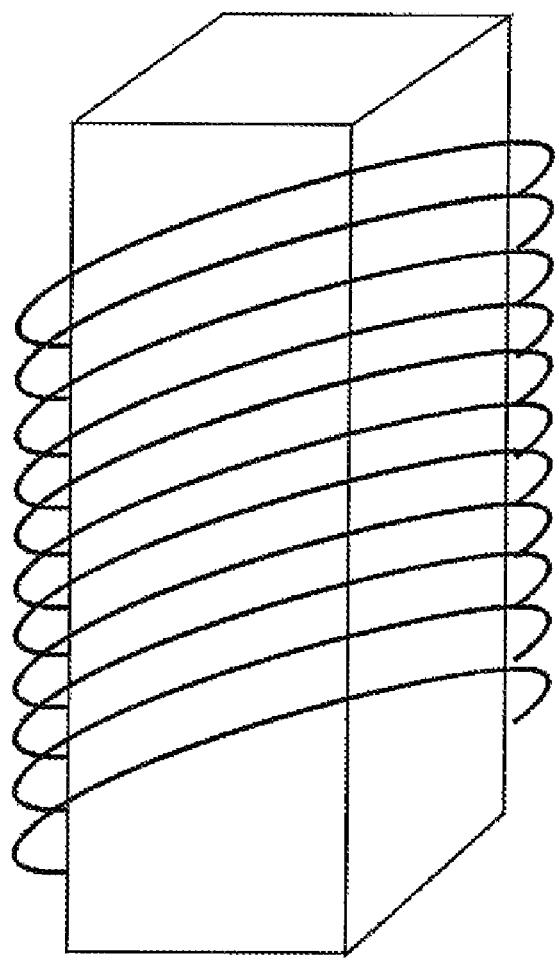
FIG. 5 is a representation of a i-core.
Figure 6:
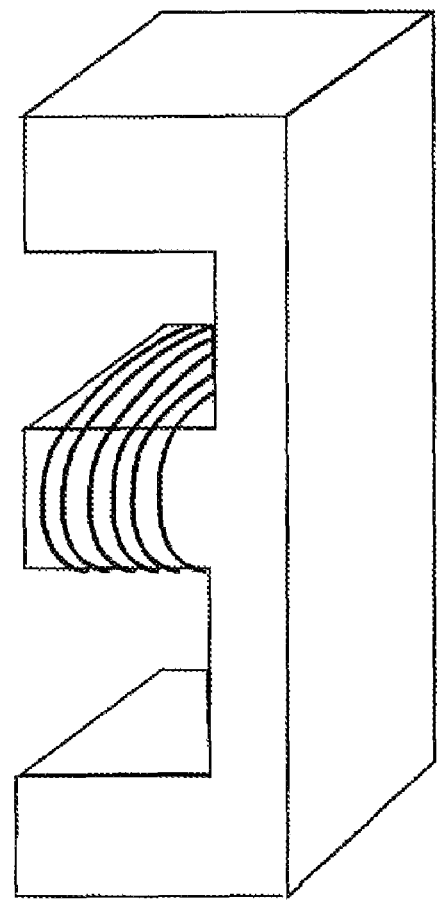
FIG. 6 is representation of an e-core.

Unlike the conventional art, the disclosure does not use a transformer to charge a battery. Instead, the disclosure uses inductive winding(s), which may take the form of a single wire winding (FIG. 2), double wire winding (FIG. 3), four wire winding (FIG. 4), i-core (FIG. 5), or E-core (FIG. 6).

A capacitor, inductor, and power line are arranged in a series parallel combination tank circuit that operates over the on and off time of a complete cycle. During on-time, the inductor is charged with electromagnetic power. During off-time, the electromagnetic power in the inductor discharges into the battery.

The concept of single wire windings, double wire windings, and cores have been discussed in U.S. patent application Ser. No. 11/426,571. An E-core is a steel-laminated, electro-magnetic, paramagnetic, or silicon Iron core in the shape of the letter "E." The inductive windings are wrapped around the middle branch of the "E".

Figure 4:
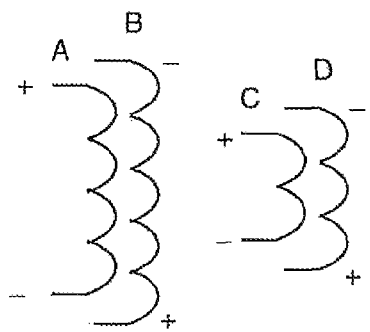
FIG. 4 is a representation of a four wire winding.

A four-wire winding may also be used for the inductive winding. FIG. 4 illustrates a four-wire winding. The four wires used to create a four-wire winding are labeled Wire A, Wire B, Wire C, and Wire D with the associated − or + sign to indicate the direction of current flow. In the figures to follow, the labels "A+, A−, B+, B−, C+, C−, D+, and D−" will be used to illustrate how the four-wire winding is connected to the incoming power line and the battery. The following should be connected to the first incoming power line node: positive (+) end of Wire A (A+), negative (−) end of Wire B (B−), positive (+) end of Wire C (C+), negative (−) end of Wire D (D−). The following should be connected to the second incoming power line node: negative (−) end of Wire A (A−), positive (−) end of Wire B (B+), negative (−) end of Wire C (C−), positive (+) end of Wire D (D+).

Additionally, in a four wire winding, the first two wires, Wire A and Wire B are wrapped together until the desired number of layers are reached. Then the last two wires, Wire C and Wire D are wrapped together, on top of Wire A and Wire B, until the desired number of layers are reached.

In the present disclosure, the inductive windings for the double wire winding, e-core, and four wire windings, may be wrapped in the same direction, meaning as soon as the end is reached, the inductive windings are pulled back straight back to start at a common beginning, or in alternate directions, meaning as soon as the end is reached, the inductive windings are wrapped in the opposite direction. The wiring is done in multiple layers.

DC Drive

The disclosure provides a DC drive, using either two transistors or one transistor. The transistors can be any type of transistor, including bipolar, MOSFET, insulated gate bipolar, N-type, or P-type. The waveform of the DC drive may be varied so that the length of the off time is increased.

DC Drive with Single Wire Windings and Two Transistors

Figure 7:
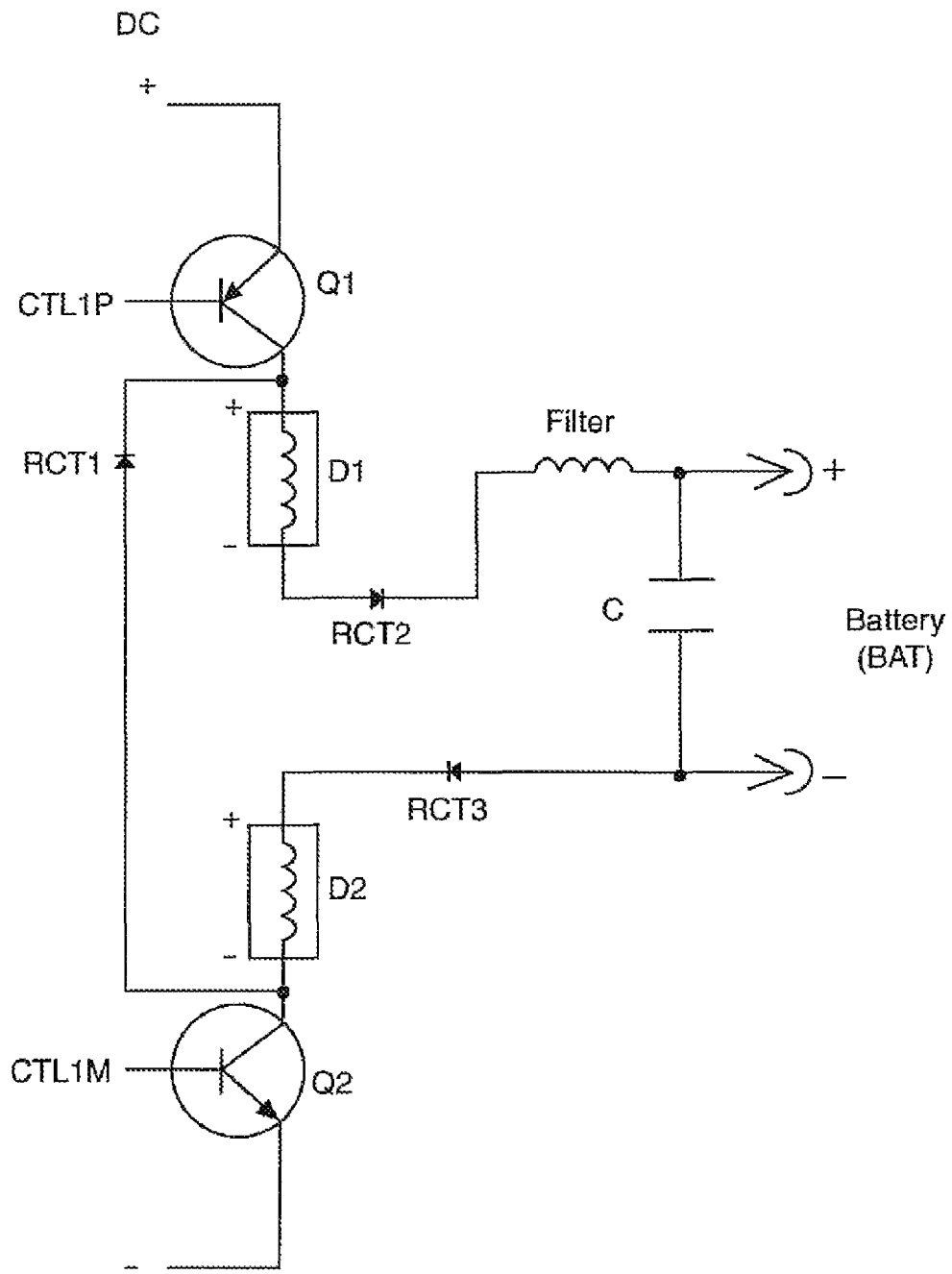
FIG. 7 is a schematic diagram of an illustrative single wire winding circuit with two transistors and a DC drive.

One embodiment of the disclosure uses a DC drive, single wire windings, and two transistors. (FIG. 7). FIG. 7 is a schematic diagram that illustrates a direct current (DC) output for charging a battery. The drive circuit includes two transistors (Q1, Q2), three rectifiers (RCT1-RCT3), two single wire windings (D1, D2), a capacitor (C), filter, and a battery (BAT). The two transistors are arranged to operate as a DC drive; they are on and off at the same time.

Transistor Q1 is an P-type bipolar junction transistor (BJT) that includes an emitter that is coupled to the positive end of the first single wire winding (IND+), a coupler that is coupled to the first power line node, and a base that is coupled to signal CTL1P. Transistor Q2 is an N-type BJT that includes a collector that is coupled to the negative end of the second single wire winding (IND2−), an emitter that is coupled to the second power line node, and a base coupled to signal CTL1M.

The first rectifier (RCT1) is coupled in series between the positive end of the first single wire winding (D1+) and the negative end of the second single wire winding (D2−). The second rectifier (RCT2) is coupled in series between the negative end of the first single wire winding (D1−) and the filter. The third rectifier (RCT3) is coupled in series between the positive end of the second single wire winding and capacitor (C).

The filter is coupled in series to the capacitor (C). The capacitor (C) is coupled in parallel with the positive terminal of the battery (BAT+) and the negative terminal of the battery (BAT−).

DC Drive with Single Wire Winding and One Transistor

Figure 8:
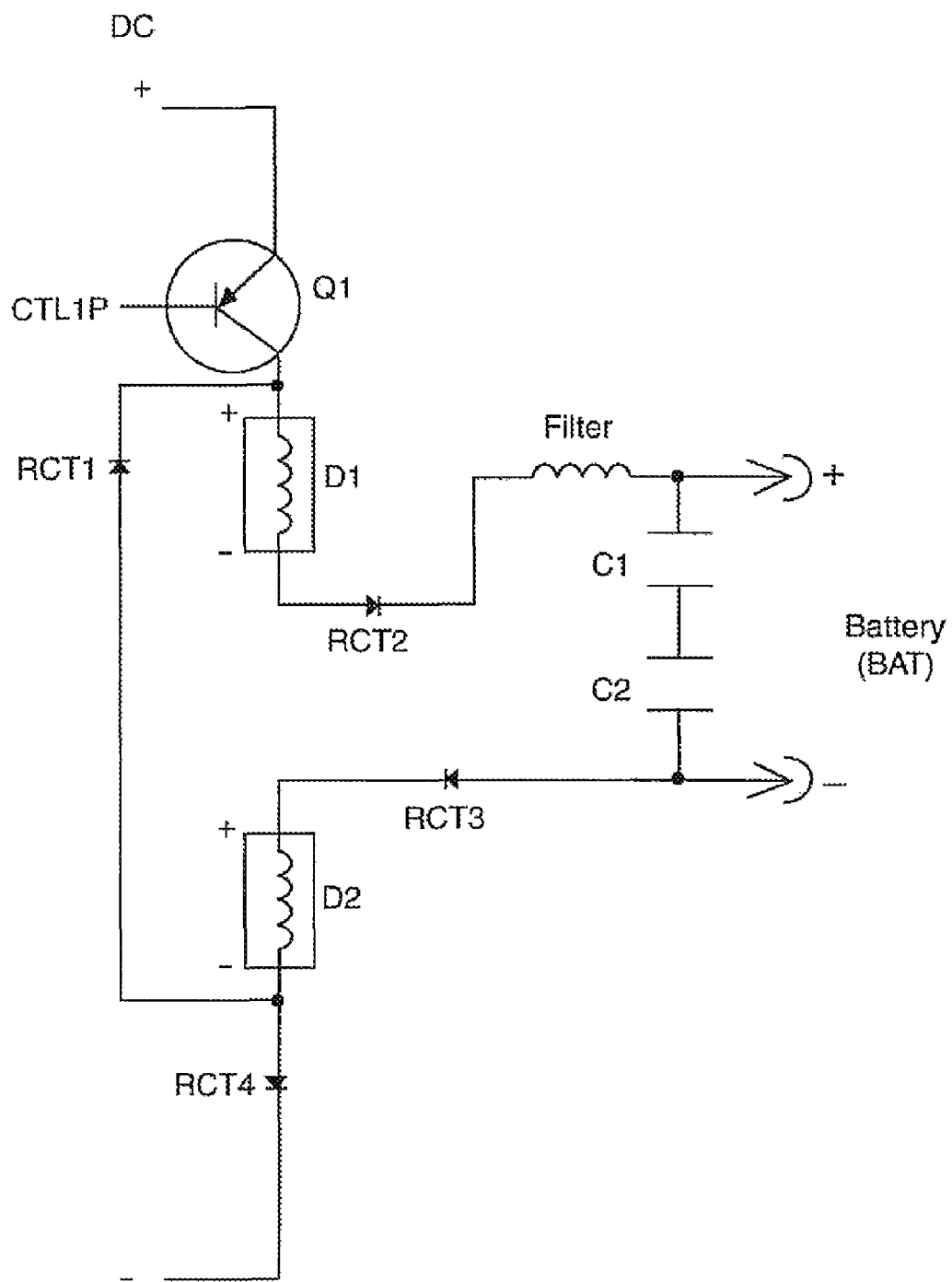
FIG. 8 is a schematic diagram of an illustrative single wire winding circuit with one transistor and a DC drive.

One embodiment of the disclosure uses a DC drive, single wire windings, and one transistor (FIG. 8). FIG. 8 is a schematic diagram that illustrates a direct current (DC) output for charging a battery. The drive circuit includes one transistor (Q1), four rectifiers (RCT1-RCT4), two single wire windings (D1, D2), two capacitors (C1, C2), filter, and a battery (BAT). The transistor is arranged to operate as a DC drive.

Transistor Q1 is an P-type bipolar junction transistor (BJT) that includes a collector that is coupled to the positive end of the first single wire winding (D1+), an emitter that is coupled to the first power line node, and a base that is coupled to signal CTL1P.

The first rectifier (RCT1) is coupled in series between the positive end of the first single wire winding (D1+) and the negative end of the second single wire winding (D2−). The second rectifier (RCT2) is coupled in series between the negative end of the first single wire winding (D1−) and the filter. The third rectifier (RCT3) is coupled in series between the positive end of the second single wire winding (D2+) and the second capacitor (C2). The fourth rectifier (RCT4) is coupled in series between the negative end of the second wire winding (IND2−) and the second power line node.

The filter is coupled in series to the first capacitor (C1) that is connected in series to the second capacitor (C2). The capacitors (C1, C2) are connected in parallel to the positive terminal of the battery (BAT+) and the negative terminal of the battery (BAT−).

DC Drive with Double Wire Winding and Two Transistors

Figure 9:
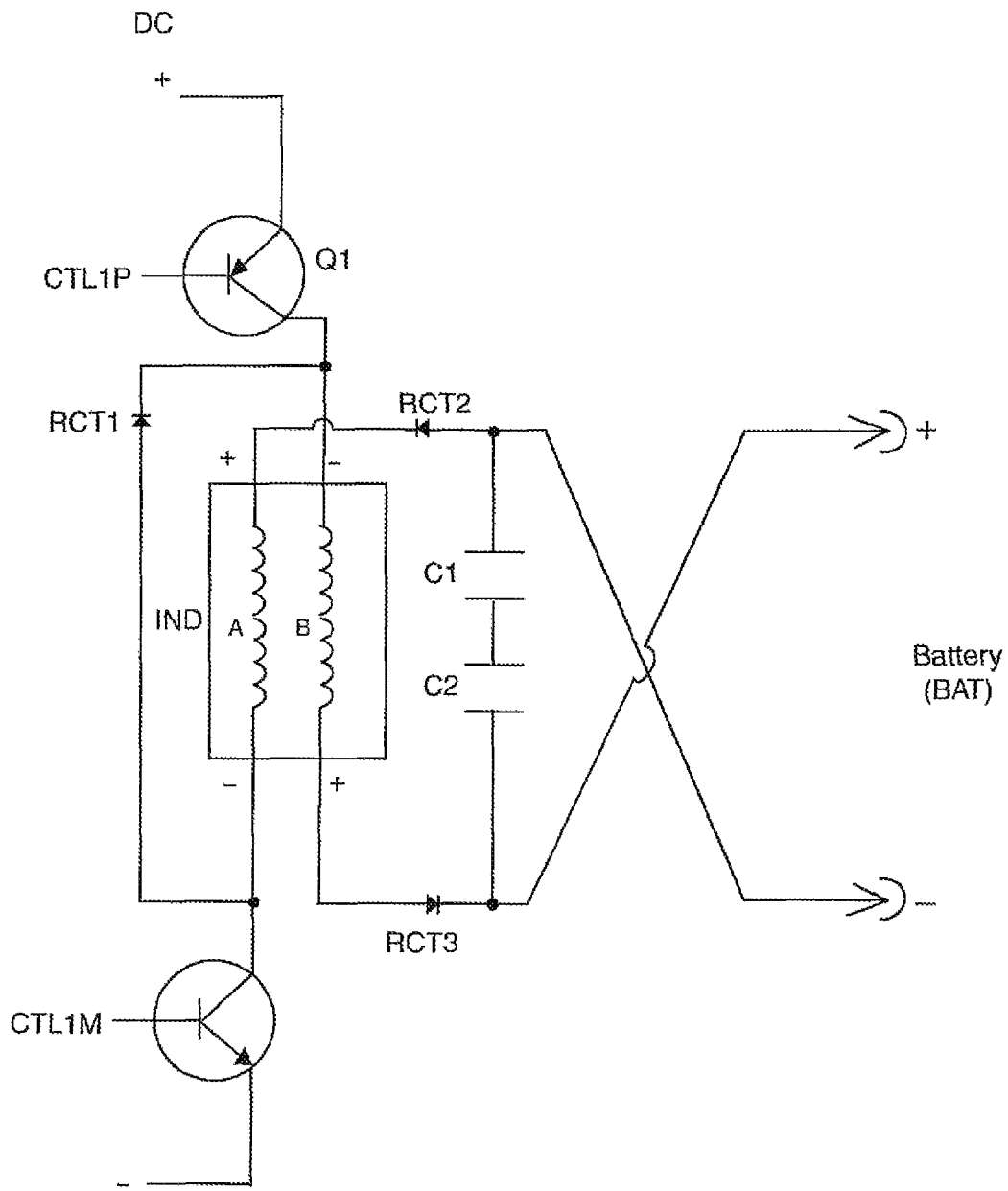
FIG. 9 is a schematic diagram of an illustrative double wire winding circuit with two transistors and a DC drive.

One embodiment of the disclosure uses a DC drive, double wire winding, and two transistors (FIG. 9). FIG. 9 is a schematic diagram that illustrates a direct current (DC) output for charging a battery. The drive circuit includes two transistors (Q1, Q2), three rectifiers (RCT1-RCT3), double wire winding (IND), two capacitors (C1, C2), and a battery (BAT). The two transistors are arranged to operate as a DC drive.

Transistor Q1 is an P-type bipolar junction transistor (BJT) that includes an collector that is coupled to the negative end of the second wire of the double wire winding (B−), an emitter that is coupled to the first power line node, and a base that is coupled to signal CTL1P. Transistor Q2 is an N-type BJT that includes a collector that is coupled to the negative end of the first wire (A−) of the double wire winding, an emitter that is coupled to the second power line node, and a base coupled to signal CTL1M.

The first rectifier (RCT1) is coupled in series between the negative end of the second wire of the double wire winding (B−) and the negative end of the first wire of the double wire winding (A−). The second rectifier (RCT2) is coupled in series between the positive end of the first wire of the double wire winding (A+) and the first capacitor (C1). The third rectifier (RCT3) is coupled in series between the positive end of the second wire of the double wire winding (B+) and the second capacitor (C2).

The first capacitor (C1) is coupled in series to the second capacitor (C2). The first capacitor (C1) is coupled in series to the negative terminal of the battery (BAT−). The second capacitor (C2) is coupled in series to the positive terminal of the battery (BAT+).

DC Drive with Double Wire Winding and One Transistor

Figure 10:
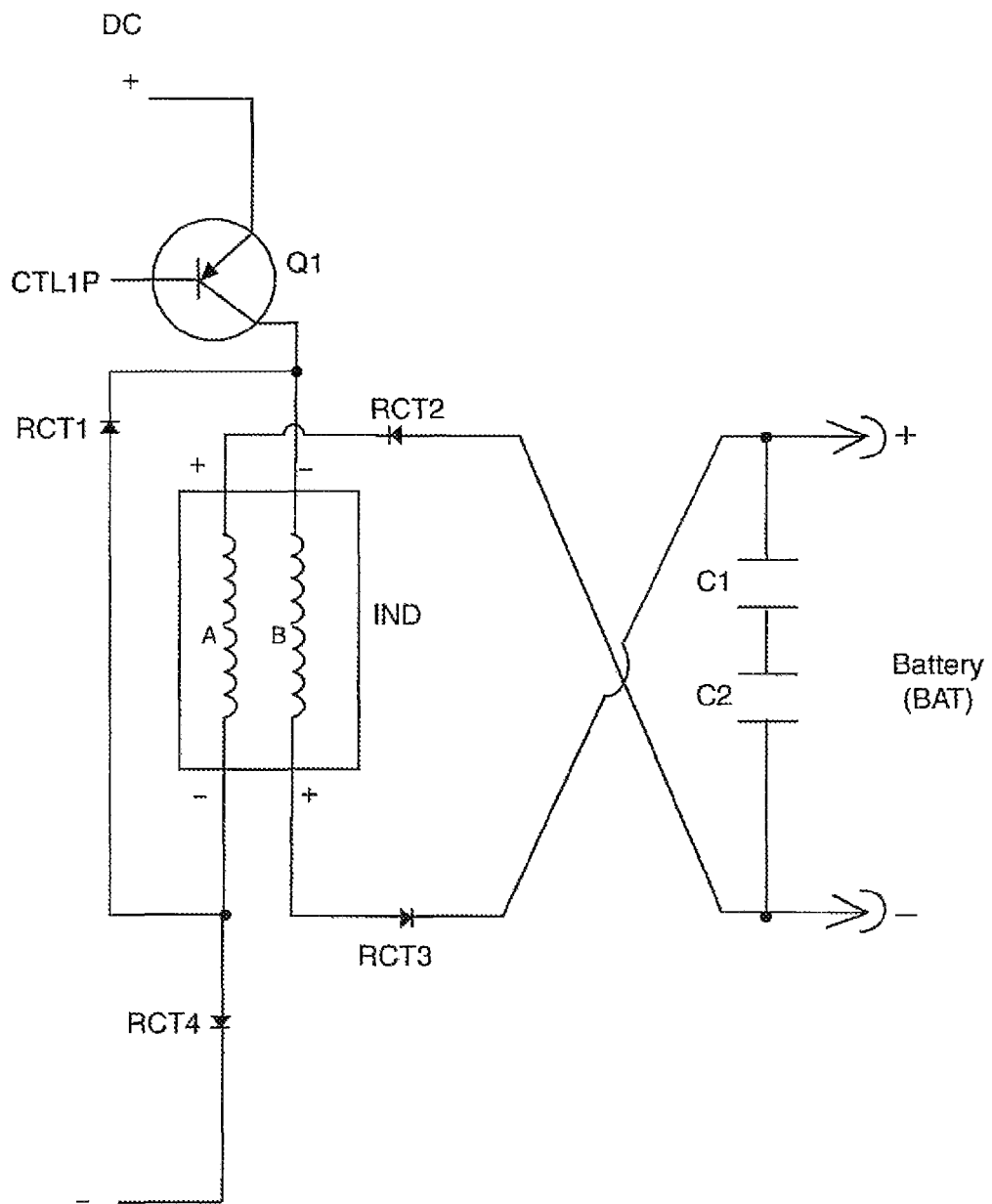
FIG. 10 is a schematic diagram of an illustrative double wire winding circuit with one transistor and a DC drive.

One embodiment of the disclosure uses a DC drive, double wire winding, and one transistor. (FIG. 10). FIG. 10 is a schematic diagram that illustrates a direct current (DC) output for charging a battery. The drive circuit includes one transistor (Q1), four rectifiers (RCT1-RCT4), double wire winding (IND), two capacitors (C1, C2), and a battery (BAT). The transistor is arranged to operate as a DC drive.

Transistor Q1 is an P-type bipolar junction transistor (BJT) that includes an collector that is coupled to the negative end of the second wire (B−) of the double wire winding (IND), an emitter that is coupled to the first power line node, and a base that is coupled to signal CTL1P.

The first rectifier (RCT1) is coupled in series between the negative end of the second wire of the double wire winding (B−) and the negative end of the first wire of the double wire winding (A−). The second rectifier (RCT2) is coupled in series between the positive end of the first wire of the double wire winding (A+) and the second capacitor (C2). The third rectifier (RCT3) is coupled in series between the positive end of the second wire of the double wire winding (B+) and the first capacitor (C1). The fourth rectifier (RCT4) is coupled in series between the negative end of the first wire of the double wire winding (A−) and the second power line node.

The first capacitor (C1) is coupled in series to the second capacitor (C2). The capacitors (C1, C2) are coupled in parallel to the positive terminal of the battery (BAT+) and the negative terminal of the battery (BAT−).

DC Drive with Four Wire Winding and Two Transistors

Figure 11:
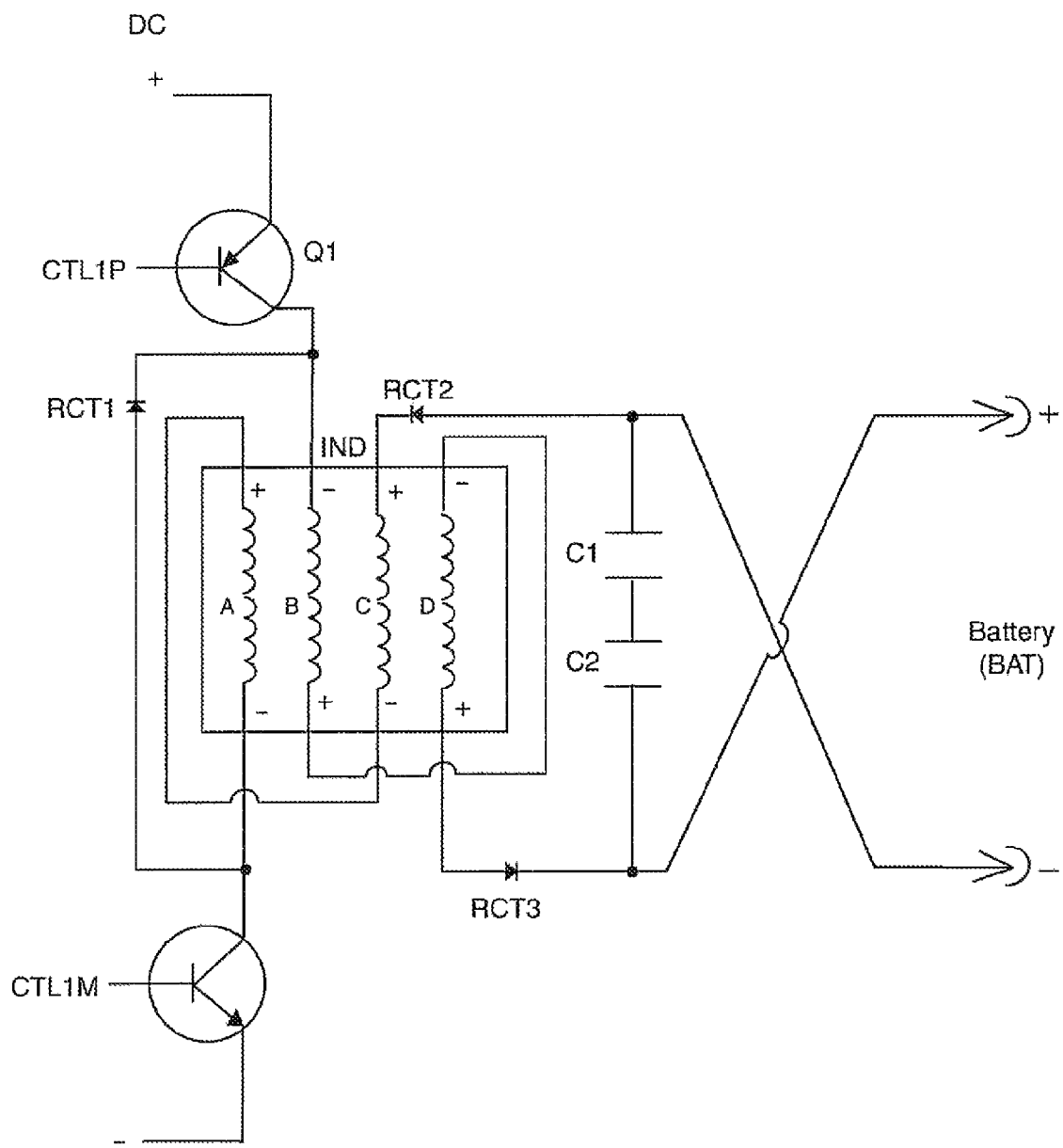
FIG. 11 is a schematic diagram of an illustrative four-wire winding circuit with two transistors and a DC drive.

One embodiment of the disclosure uses a DC drive, four-wire winding, and two transistors. (FIG. 11). FIG. 11 is a schematic diagram that illustrates a direct current (DC) output for charging a battery. The drive circuit includes two transistors (Q1, Q2), three rectifiers (RCT1-RCT3), four wire winding (IND), two capacitors (C1, C2), and a battery (BAT). The two transistors are arranged to operate as a DC drive.

Transistor Q1 is an P-type bipolar junction transistor (BJT) that includes an collector coupled to the negative end of the second wire (B−) of the four wire winding (IND), an emitter that is coupled to the first power line node, and a base that is coupled to signal CTL1P. Transistor Q2 is an N-type BJT that includes a collector that is coupled to the negative end of the first wire (A−) of the four-wire winding (IND), an emitter that is coupled to the second power line mode, and a base coupled to signal CTL1M.

The first rectifier (RCT1) is coupled in series between the negative end of the second wire of the four wire winding (B−) and the negative end of the first wire of the four wire winding (A−). The second rectifier (RCT2) is coupled in series between the positive end of the third wire of the four wire winding (C+) and the first capacitor (C1). The third rectifier (RCT3) is coupled in series between the positive end of the fourth wire of the four wire winding (D+) and the second capacitor (C2).

The positive end of the first wire (A+) of the four wire winding (IND) is coupled in series to the negative end of the third wire (C−) of the four wire winding (IND). The positive end of the second wire (B+) of the four-wire winding (D1) is coupled in series with the negative end of the fourth wire (D−) of the four-wire winding.

The first capacitor (C1) is coupled in series to the second capacitor (C2). The first capacitor (C1) is coupled in series to the negative terminal of the battery (BAT−). The second capacitor (C2) is coupled in series to the positive terminal of the battery (BAT+).

DC Drive with Four Wire Winding and One Transistor

Figure 12:
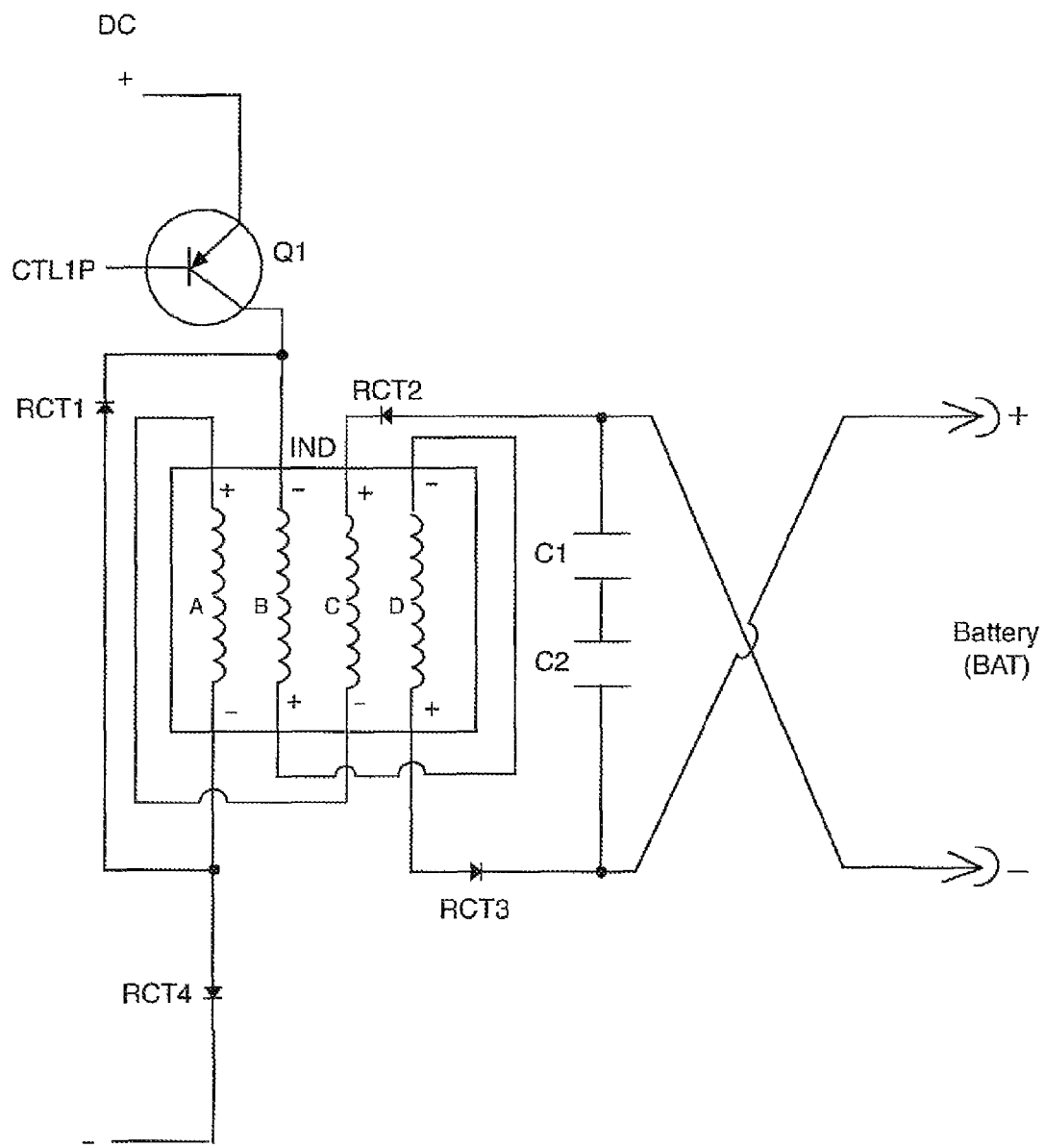
FIG. 12 is a schematic diagram of an illustrative four-wire winding circuit with one transistor and a DC drive.

One embodiment of the disclosure uses a DC drive, four-wire winding, and one transistor. (FIG. 12). FIG. 12 is a schematic diagram that illustrates a direct current (DC) output for charging a battery. The drive circuit includes one transistor (Q1), four rectifiers (RCT1-RCT4), four wire winding (IND), two capacitors (C1, C2), and a battery (BAT). The transistor is arranged to operate as a DC drive.

Transistor Q1 is a P-type bipolar junction transistor (BJT) that includes a collector that is coupled to the negative end of the second wire of the four-wire winding (B−), an emitter that is coupled to the first power line node, and a base that is coupled to signal CTL1P.

The first rectifier (RCT1) is coupled in series between the negative end of the second wire of the four wire winding (B−) and the negative end of the first wire of the four wire winding (A−). The second rectifier (RCT2) is coupled in series between the positive end of the third wire of the four wire winding (C+) and the first capacitor (C1). The third rectifier (RCT3) is coupled in series between the positive end of the fourth wire of the four wire winding (D+) and the second capacitor (C2). The fourth rectifier (RCT4) is coupled in series between the negative end of the first wire of the four wire winding (A−) and the second power line node.

The positive end of the first wire (A+) of the four wire winding is coupled in series to the negative end of the third wire (C−) of the four wire winding. The positive end of the second wire (B+) of the four-wire winding is coupled in series with the negative end of the fourth wire (D−) of the four-wire winding.

The first capacitor (C1) is coupled in series to the second capacitor (C2). The first capacitor (C1) is coupled in series to the negative terminal of the battery (BAT−). The second capacitor (C2) is coupled in series to the positive terminal of the battery (BAT+).

AC Drive

The disclosure provides an AC drive, using an H-bridge drive. The concept of H-bridge drives has been discussed in U.S. patent application Ser. No. 11/426,571.

AC Drive with Single Wire Windings and H-Bridge Drive

Figure 13:
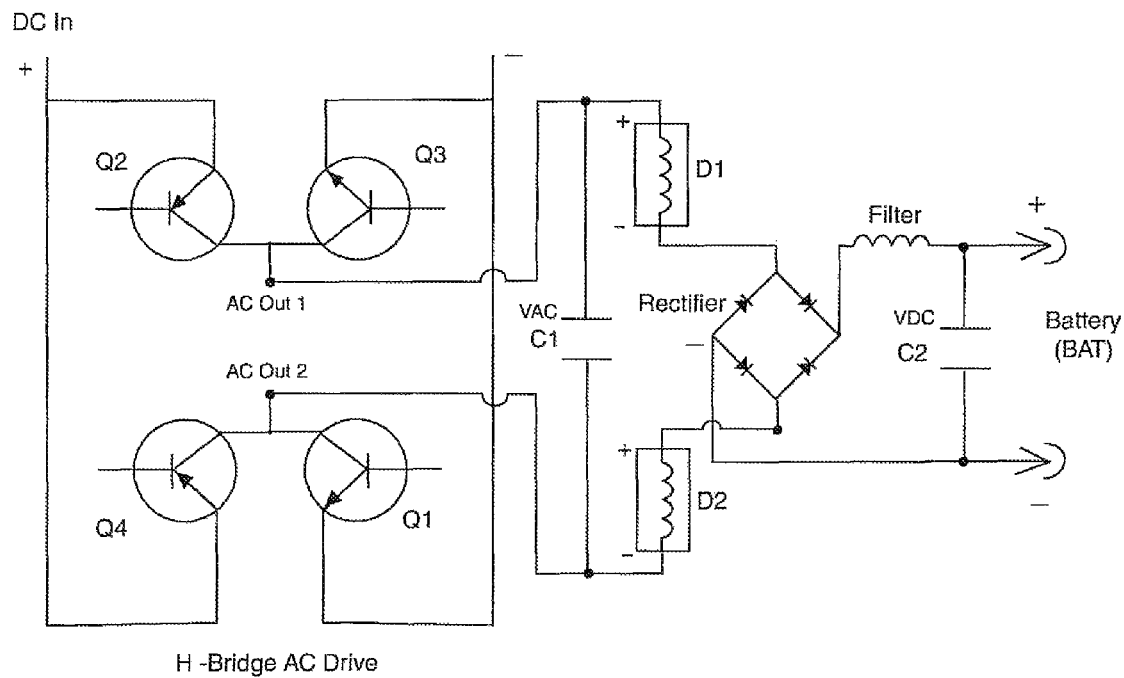
FIG. 13 is a schematic diagram of an illustrative single-wire winding circuit with four transistors and an AC drive.

One embodiment of the disclosure uses an AC drive, single wire windings, and an H-bridge drive. (FIG. 13). FIG. 13 is a schematic diagram that illustrates an alternate current (AC) output for charging a battery. The drive circuit includes an H-bridge drive, four rectifiers (RCT1-RCT4), two single wire windings (D1, D2), two capacitors (C1, C2), filter, and a battery (BAT).

AC OUT 1 and AC OUT 2 are coupled in series with the first capacitor (C1). The first capacitor (C1) is coupled in parallel with the positive end of the first single wire winding (IND1+) and negative end of the second single wire winding (IND2−).

The negative end of the first single wire winding (IND1−) and the positive end of the second wire winding (IND2+) are coupled in parallel with the full-wave rectifier. The full-wave rectifier is coupled in parallel to the second capacitor (C2) that is coupled in series with a filter. The second capacitor (C2) is coupled in parallel to the positive terminal of the battery (BAT+) and the negative terminal of the battery (BAT−).

AC Drive with Double Wire Winding and H-Bridge Drive

Figure 14:
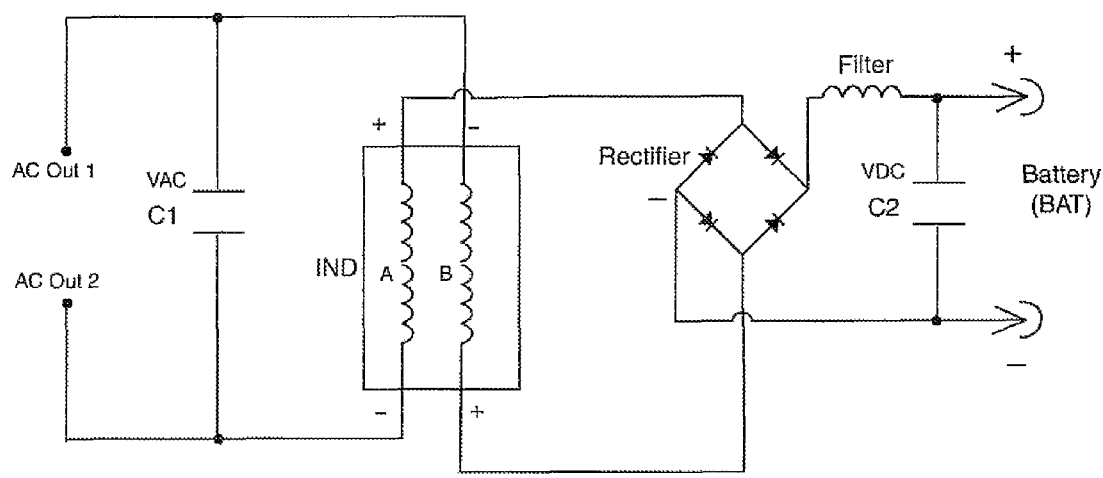
FIG. 14 is a schematic diagram of an illustrative double-wire winding circuit with four transistors and an AC drive.

One embodiment of the disclosure uses an AC drive, double wire winding, and an H-bridge drive. (FIG. 14). FIG. 14 is a schematic diagram that illustrates an alternate current (AC) output for charging a battery. The drive circuit includes an H-bridge drive, four rectifiers (RCT1-RCT4), double wire winding (IND), two capacitors (C1, C2), filter, and a battery (BAT).

AC OUT 1 and AC OUT 2 are coupled in series with the first capacitor (C1). The first capacitor (C1) is coupled in parallel with the negative end of the first wire of the double wire winding (A−) and negative end of the second wire of the double wire winding (B−).

The positive end of the first wire of the double wire winding (A+) and the positive end of the second wire winding (B+) are coupled in parallel with the full-wave rectifier. The full-wave rectifier is coupled in parallel to the second capacitor (C2) that is coupled in series with a filter. The second capacitor (C2) is coupled in parallel to the positive terminal of the battery (BAT+) and the negative terminal of the battery (BAT−).

In general, the presently described apparatus, system and methods conserve energy by using an inductor rather than transformer to charge a battery. In one cycle, during on-time, the inductor is charged with electromagnetic power. In the off-time, the electromagnetic power in the inductor discharges into the battery.

Although the preceding description describes various embodiments of the system, the present disclosure is not limited to such embodiments, but rather covers all modifications, alternatives, and equivalents that fall within the spirit and scope of the invention. Since many embodiments can be made without departing from the spirit and scope of the present invention, the invention resides in the claims hereinafter appended.

What is claimed:

1. A battery charger comprising:
 a. an inductor circuit that has a first associated reactance, wherein the inductor circuit is comprised of at least two windings, said at least windings comprising a first winding and a second winding, wherein the first winding is comprised of a first wire that is wound around a core from a starting position, wherein the second winding is comprised of a second wire that is wound around the core in a common direction with the first wire from the same starting position, wherein the first and second wires are further wound around the core a second time from the either the same starting position or opposite starting position to form a multi-layer arrangement, wherein the inductor circuit is arranged such that the first wire and the second wire each include a negative end and a positive end, wherein the negative end of the first wire is located adjacent to the positive end of the second wire, and wherein the positive end of the first wire is located adjacent to the negative end of the second wire;
 b. a capacitor circuit that is coupled in series in between at least two windings from the inductor circuit, wherein the capacitor circuit has a second associated reactance, wherein the capacitor circuit and at least two windings from the inductor circuit are arranged in a series parallel combination circuit that operates over the on and off time of a complete cycle, wherein the apparatus is arranged that during on-time, the inductor circuit is charged with electro-magnetic power by pushing electrical energy through the first winding and pulling electric energy through the second winding, and that during off-time, the electro-magnetic power in the inductor circuit discharges into a battery and;

c. a DC drive circuit that is arranged to selectively charge the inductor circuit, wherein the DC drive circuit is comprised of at least a first and second transistor circuit, wherein: the first transistor circuit includes a first collector that is coupled to the negative end of the second wire of the double wire winding, a first emitter that is arranged for operation from a first terminal of the power source; the second transistor circuit includes a second collector that is coupled to the negative end of the first wire of the double wire winding, a second emitter that is coupled to a second terminal of the power source; a first, second, and third rectifier circuit, wherein: the first rectifier circuit is coupled between the negative end of the second wire of the double wire winding and the negative end of the first wire of the double wire winding, the second rectifier circuit is coupled between the positive end of the first wire of the double wire winding and a first capacitor, and the third rectifier circuit is coupled between the positive end of the second wire of the double wire winding and a second capacitor; and the first and second capacitor, wherein: the first capacitor is coupled in series to the second capacitor; the first capacitor is coupled in series to a negative terminal of the battery; and the second capacitor is coupled in series to a positive terminal of the battery.

2. A battery charger comprising:

a. an inductor circuit that has a first associated reactance, wherein the inductor circuit is comprised of at least two windings, said at least windings comprising a first winding and a second winding, wherein the first winding is comprised of a first wire that is wound around a core from a starting position, wherein the second winding is comprised of a second wire that is wound around the core in a common direction with the first wire from the same starting position, wherein the first and second wires are further wound around the core a second time from the either the same starting position or opposite starting position to form a multi-layer arrangement, wherein the inductor circuit is arranged such that the first wire and the second wire each include a negative end and a positive end, wherein the negative end of the first wire is located adjacent to the positive end of the second wire, and wherein the positive end of the first wire is located adjacent to the negative end of the second wire;

b. a capacitor circuit that is coupled in series in between at least two windings from the inductor circuit, wherein the capacitor circuit has a second associated reactance, wherein the capacitor circuit and at least two windings from the inductor circuit are arranged in a series parallel combination circuit that operates over the on and off time of a complete cycle, wherein the apparatus is arranged that during on-time, the inductor circuit is charged with electro-magnetic power by pushing electrical energy through the first winding and pulling electric energy through the second winding, and that during off-time, the electro-magnetic power in the inductor circuit discharges into a battery and;

c. a DC drive circuit that is arranged to selectively charge the inductor circuit, wherein the DC drive circuit is comprised of at least a first and second transistor circuit, wherein: the first transistor circuit includes a first collector that is coupled to the negative end of the second wire of the double wire winding, a first emitter that is arranged for operation from a first terminal of the power source; a first, second, third, and fourth rectifier circuit, wherein: the first rectifier circuit is coupled between the negative end of the second wire of the double wire winding and the negative end of the first wire of the double wire winding, the second rectifier circuit is coupled between the positive end of the first wire of the double wire winding and a second capacitor, the third rectifier circuit is coupled between the positive end of the second wire of the double wire winding and a first capacitor, and the fourth rectifier circuit is coupled between the negative end of the first wire of the double wire winding and a second terminal of the power source; and the first and second capacitor, wherein: the first capacitor is coupled in series to the second capacitor; the said capacitors are coupled in parallel to a positive terminal of the battery and a negative terminal of the battery.

* * * * *